Dec. 21, 1926.

O. M. EDSON 1,611,172

ROTARY ENGINE

Filed Jan. 2, 1926     4 Sheets-Sheet 1

INVENTOR
O. M. Edson
BY Victor J. Evans
ATTORNEY

R. A. Thomas.
Witness

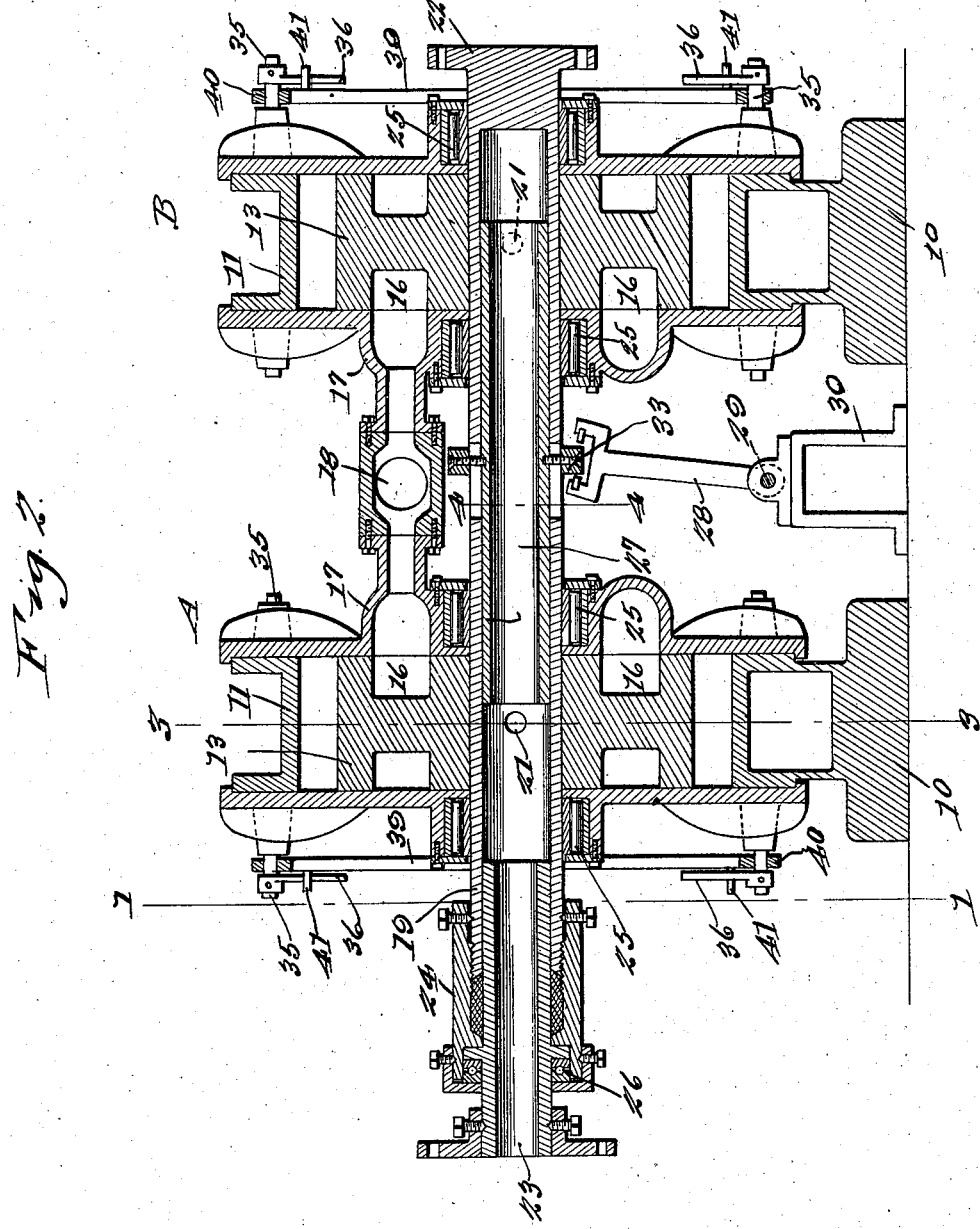

Dec. 21, 1926.

O. M. EDSON 1,611,172

ROTARY ENGINE

Filed Jan. 2, 1926 4 Sheets-Sheet 3

INVENTOR
O. M. Edson
BY Victor J. Evans
ATTORNEY

Witness

Dec. 21, 1926.
O. M. EDSON
1,611,172
ROTARY ENGINE
Filed Jan. 2, 1926    4 Sheets-Sheet 4
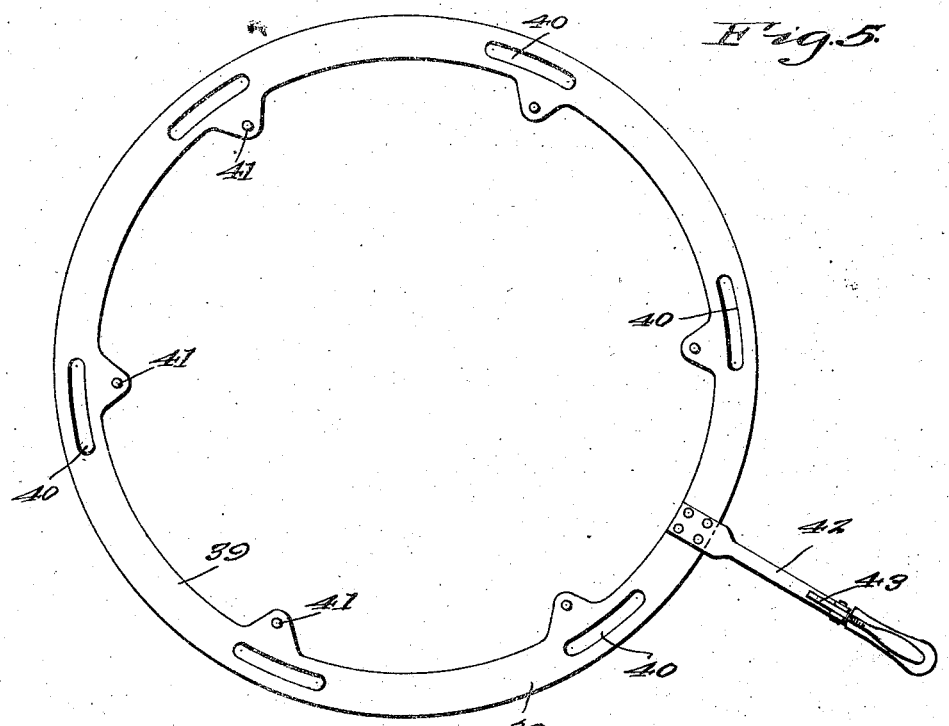
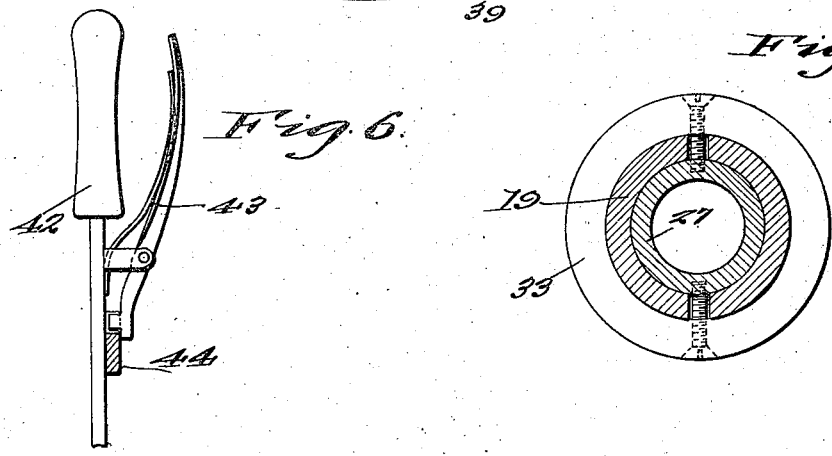
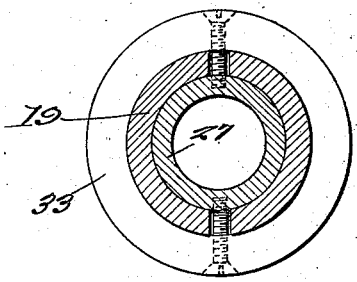
INVENTOR
O. M. Edson
BY Victor J. Evans
ATTORNEY
R. A. Thomas
Witness Patented Dec. 21, 1926.

1,611,172

UNITED STATES PATENT OFFICE.

OTTO M. EDSON, OF BREMERTON, WASHINGTON.

ROTARY ENGINE.

Application filed January 2, 1926. Serial No. 78,976.

This invention relates to a rotary steam engine, the general object of the invention being to provide a pair of members, one having its parts so arranged that its rotor can rotate in one direction and the other member having its parts arranged so that its rotor can revolve in the opposite direction, with means for supplying steam to either member so that the engine can be driven in either direction.

Another object of the invention is to connect the rotors directly with the drive shaft so that power is applied directly to the shaft and to arrange the steam controlling valve within the shaft, with means for passing the steam through the shaft to either member.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 2 is a sectional view on line 2—2 of Figure 1.

Figure 4 is a sectional view on line 4—4 of Figure 2.

Figure 5 is a view of the swinging adjusting ring and its handle.

Figure 6 is a view of the handle, with its latch member.

Figure 1:
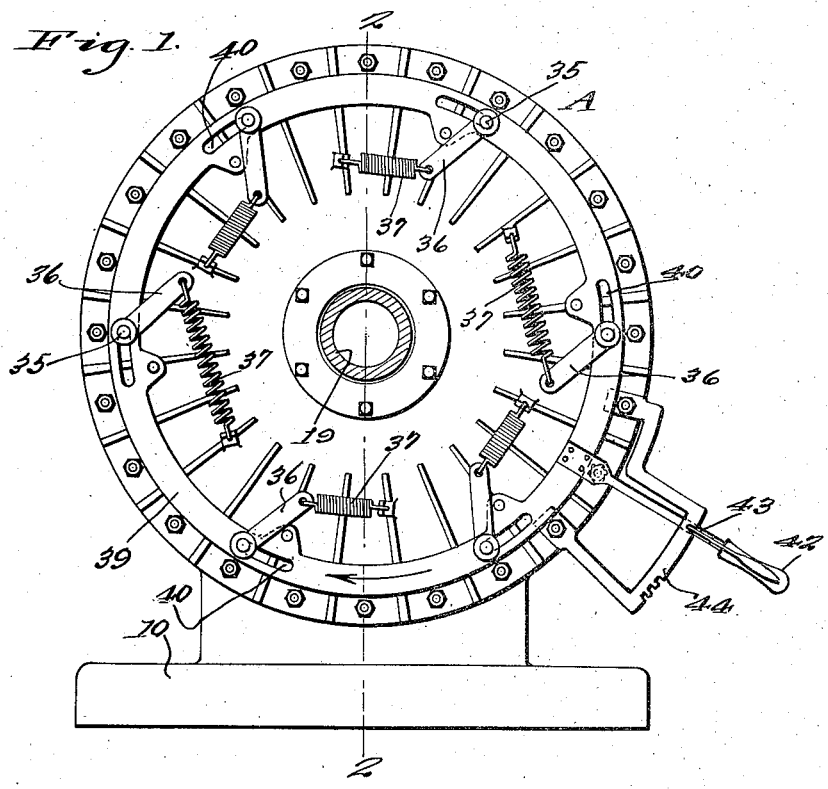
Figure 1 is a sectional view on line 1—1 of Figure 2.
Figure 7:
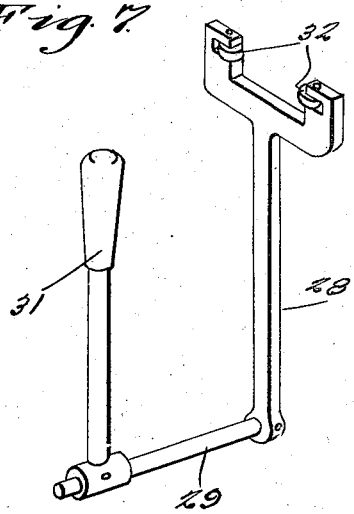
Figure 7 is a view of the valve adjusting means.
Figure 3:
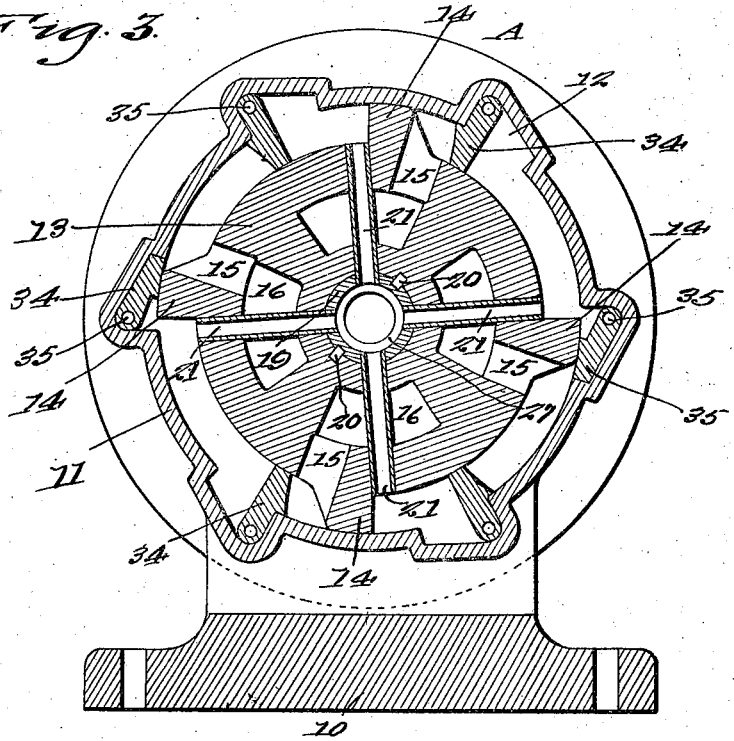
Figure 3 is a sectional view on line 3—3 of Figure 2.
Figure 8:
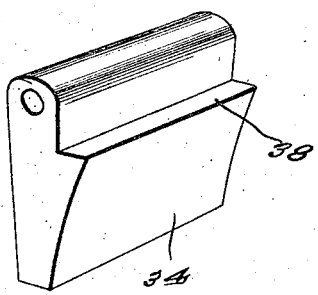
Figure 8 is a view of one of the swinging abutments.

As shown in these drawings, I provide a pair of members A and B which are arranged in parallel relation upon the supports 10 and each of which comprises a cylinder 11, having the recesses or pockets 12 formed in its circumference, and a rotor 13 rotatably mounted in the cylinder and having the abutments 14 on its circumference which are arranged to make a tight fit with the inner circumference of the cylinder and to divide the space between the cylinder and rotor into steam receiving chambers. The rotor is provided with ports 15, one of which is arranged directly in front of each abutment, and these ports communicate with the recesses 16 formed in the side of the rotor and which are in communication with the exhaust manifold 17 on the cylinder, the two exhaust manifolds being connected with a common exhaust passage 18 placed between the two members. A hollow shaft 19 passes through the centers of the two cylinders and the rotors are keyed to this shaft, as shown at 20. Inlet passages 21 are formed in each rotor and the inner ends of these passages communicate with the interior of the shaft and their outer ends communicate with the steam chambers, directly behind the abutments. One end of the hollow shaft is made solid, as shown at 22, and its other end receives a steam supply coupling 23, a packing gland 24 being arranged between the two parts to make a steam tight joint. Roller bearings 25 are provided at each side of each cylinder for the shaft and ball bearings 26 are placed between a part of the gland and the coupling 23. A valve 27 is arranged in the shaft 19 and is made in the form of a tube of sufficient length to cover either the passages 21 in the member A or those in the member B, so that when steam is passing to one member, it cannot pass to the other member. The valve is shifted from one position to another through means of a forked member 28 carried by a shaft 29 journaled to a support 30 arranged between the members A and B and having a handle 31 thereon whereby the shaft can be rocked. The prongs of the fork carry rollers 32 arranged to engage a collar 33 on the valve 27. Swinging abutments 34 are arranged in the pockets or recesses 12, each member being secured to a shaft 35 journaled in the cylinder and having an arm 36 on its projecting end which is engaged by a spring 37 fastened to a part of the cylinder. These springs tend to hold the parts with the swinging abutments projecting from the pockets and engaging the rotors to form abutments against which the steam will react against the abutments 14 of the rotors so as to cause the rotors to revolve in the cylinders. A shoulder 38 is formed on each swinging abutment to engage a part of the cylinder to hold the valve against further movement by its spring and the front face of each abutment 14 is rounded so as to engage a swinging abutment, during the movement of the rotor, to force the swinging abutment back into its recess and thus permit the abutment to pass it. The spring then returns the swinging abutment to its inner position.

From the foregoing, it will be seen that steam introduced into the hollow shaft will pass through the passages 21 of the rotor of the member, the passages of which are uncovered by the valve 27. The steam, passing from the passages, will enter the chambers formed by the swinging abutments 34 and the abutments 14 and thus expand and act on the abutments 14 to revolve the rotor. As soon as an abutment strikes a swinging abutment, it will force the swinging abutment into its recess which permits the abutment to pass into the next steam chamber, which chamber is immediately placed in communication with the exhaust means through the port 15 and recess 16, so that the steam in this chamber will pass to exhaust. As soon as this abutment passes the swinging abutment, the swinging abutment will be returned by its spring so as to form a space between itself and the abutment which has just passed it to receive the steam from the passage 21 in rear of said abutment. Thus the rotor is propelled by a continuous flow of steam which is exhausted after it has acted on the abutments of the rotor for a certain period of time, the action being entirely automatic and caused by the revolution of the rotor.

As the parts are so formed in each member that the rotor can only revolve in one direction, two members are necessary to provide an engine which can rotate in either direction. The swinging abutments and abutments in one member are oppositely arranged to those in the other member and I provide means for moving the swinging abutments 34 of one member into the recesses to permit the rotor of this member to revolve in a reverse direction, this member having its rotor propelled from the other member. In this case, the rotor of the member whose swinging abutments have been moved into their recesses, acts as a fly wheel for the engine.

The means for moving the swinging abutments into the recesses comprises a ring 39 having slots 40 therein for receiving the ends of the swinging abutment shafts 35 and having projections 41 thereon for engaging the arms 36 of the swinging abutments to so move the arms that the shafts will be rocked to force the swinging abutments into the recesses. A handle 42 is fastened to the ring and has a latch 43 pivoted thereto for engaging a toothed bracket 44 on the device for holding the ring in adjusted position. The closed end of shaft 19 may be provided with any suitable coupling, so that this shaft may be connected to the machinery to be driven.

When the engine is to be driven in one direction, the handle 31 is manipulated to place the valve 27 in proper position to permit steam to flow to the desired member. This steam will act on the abutments to revolve the rotor as before explained and before the steam is turned on, the handle 42 is moved to shift the ring 39 on the second member to a position where it will move the swinging abutments of said member into the recesses so that the rotor of this member can revolve in a reverse direction and act as a fly wheel for the shaft 19. If the engine is to be rotated in an opposite direction, the valve 27 is shifted to supply steam to the other member and the ring of the first member is moved to pocket the swinging abutments thereof while the ring of the second member is shifted to permit the springs to move the swinging abutments out of the pockets.

As will be seen, the shaft is directly driven from the rotors and the pressure is exerted at right angles to the center of the drive shaft. All the wearing parts may be provided with detachable faces, so that they can be renewed when worn.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A rotary engine of the class described, comprising a pair of members, each of which comprising a cylinder having pockets in its circumference, spring pressed swinging abutments in the pockets and a rotor in the cylinder having abutments thereon for forcing the swinging abutments into their pockets, a hollow shaft passing through both cylinders and to which the rotors are connected, means for supplying steam to said shaft, each rotor having inlet passages therein in communication with the shaft, the inlet ends of said passages being arranged in rear of each abutment, each rotor having an exhaust port in the front of each abutment, exhaust means connected with the exhaust ports and manually operated means for moving all of the swinging abutments of either cylinder into the pockets for enabling the rotor of said cylinder to rotate in a reverse direction and means for causing the steam in the hollow shaft to pass into either one cylinder or the other.

In testimony whereof I affix my signature.

OTTO M. EDSON.